Aug. 14, 1962  A. BOTTOMLEY  3,048,895
PROCESS FOR PRODUCING BIAXIALLY ORIENTED PLASTIC FILM
Filed Aug. 20, 1959

INVENTOR.
ANTHONY BOTTOMLEY
BY Hudson and Young
ATTORNEYS 3,048,895
PROCESS FOR PRODUCING BIAXIALLY
ORIENTED PLASTIC FILM
Anthony Bottomley, Bartlesville, Okla., assignor to Phillips Petroleum Company, a corporation of Delaware
Filed Aug. 20, 1959, Ser. No. 835,080
3 Claims. (Cl. 18—57)

This invention relates to a process for producing biaxially oriented plastic film.

Heretofore, films of solid plastic materials have been prepared by several different methods. Such methods include casting of films from solutions, the blown tubing technique whereby a tube of polymer is extruded and is thereafter expanded by applying pneumatic pressure to the interior of the tube so as to reduce the wall thickness of the tube to the desired size, and extrusion of the molded polymer or plastic material through a small opening, this often being known as "slot die" extrusions. It is also known that many plastic film materials are rendered thinner and more flexible when subjected to both lateral and longitudinal stretching and that the physical characteristics of such stretched film are quite different from the physical characteristics of the unstretched films or films stretched in one direction only. This is believed to be due to orientation which is developed during the stretching. The yield point of the material and the ultimate strength are both increased and the protective qualities of the film when used as a wrap for fruit, vegetables, or other perishable foods, is notably enhanced. Finally, film so stretched is not only reduced in thickness but considerably increased in area so that it is possible to wrap or cover many more articles or surfaces than could have been done with the unstretched film.

The following are objects of my invention.

An object of my invention is to provide an improved process for the production of and films of plastic material. A further object of my invention is to provide an improved process for the production of film from polyethylene, especially high density polyethylene. A further object of my invention is to provide a process in which the degree of lateral stretching can be carefully controlled.

Figure 1:
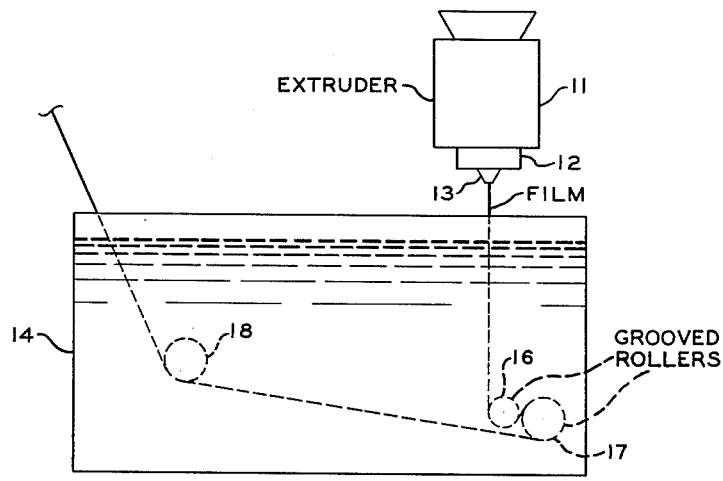
Figure 2:
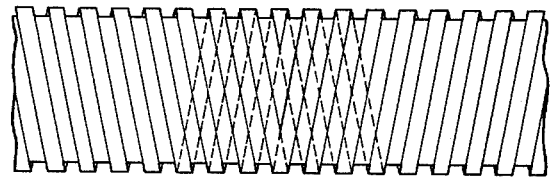

Other objects and advantages of my invention will be apparent to one skilled in the art upon reading the accompanying disclosure which includes a drawing comprising FIGURE 1, a schematic view showing my invention and FIGURE 2, an enlarged side view of a grooved roller used in my apparatus and in carrying out the process of my invention.

Broadly, my invention resides in a process of producing biaxially oriented thin plastic films which comprises extruding a melt of the plastic through a slot die to form a film; passing the film over at least one roller having helical grooves on the surface thereof extending outwardly from a point approximately at the center of the film passing thereover, said roller rotating at a rate such that the peripheral speed of the roller is substantially greater than the linear speed of the film passing thereover. In another aspect, my invention resides in the apparatus for carrying out this process, the apparatus comprising an extruder; a slot die; at least one grooved roller positioned so that film extruded from the slot die passes over a substantial portion thereof, said grooves extending helically from a point approximately at the midpoint of film passing thereover; and means to drive said roller.

The invention is applicable to the broad class of thermoplastic materials which can be used to form films. These include cellophane, rubber hydrochloride, polyvinylchloride, copolymers of vinylchloride and another monomer such as vinylacetate and vinylidene chloride, polyethylene, polypropylene, and copolymers of ethylene and monomers such as 1-butene. Since my development work has been primarily directed to work with polyethylene, the major portion of this description will be directed to this material but, it will be realized, the process can be used with other plastic materials as set forth above. In fact, the preferred material for use in this invention is referred to in the art as high density polyethylene. This term signifies that the density of the polyethylene is at least 0.940 gram per cubic centimeter at 20° C. Usually, the density is in the range of 0.940 to 0.980 and, often, within the range of 0.950 to 0.970. The term "density," as used in this specification, refers to the weight per unit volume (grams per cubic centimeter) at 20° C. These high density polyethylenes can also be characterized in terms of their melt index. The melt index is a measure of the rate at which the polyethylene can be extruded under specified conditions. Melt index is inversely proportional to the molecular weight of the polymer. The melt index is determined according to ASTM Method D–1238–52T. The high density polyethylene which can be used generally have a melt index of at least 0.5 and preferably from 0.9 to 25. They can also be characterized as highly crystalline.

It is believed that the invention can be best understood from the accompanying drawing. Directing attention thereto, FIGURE 1 illustrates a schematic presentation of this invention. In this figure, an extruder 11 is connected to a die 12 which has a slot die 13 at the end thereof. Molten polymer is extruded through the slot die 13 and into the quench bath 14. This quench bath is generally filled with water but other materials can be used. The coolant can be any liquid which is both physically and chemically inert toward the film extruded, i.e., the liquid which either dissolves, plasticizes, hardens, softens, or chemically reacts with the extruded film. In addition to the water mentioned, other liquids include ethylene glycol, diethylene glycol, esters of these materials, and glycerine. The particular liquid used in the quench is not a part of my invention. Particularly when dealing with polyethylene, it is important that the space between the die nozzle and the quench liquid be small. This distance between the die face and the surface of the quench liquid should not exceed about ¼ inch. The minimum distance varies from one apparatus to another but should be at least a distance such that there is no bubble formation in the quenched liquid. Such bubble formation tends to form blemishes on the film surface.

Positioned within the quench liquid, I have shown rollers 16, 17 and 18. Rollers 16 and 17 constitute essential features of my invention, and these rollers will be hereinafter more fully discussed. Some means are provided for removing the extruded films from the quench bath but this, again, does not constitute an essential feature of my invention and need not be further described.

FIGURE 2 showed a side view of one of the rollers 16 or 17. These rollers have a plurality of grooves formed in the surface thereof, these grooves extending outwardly from approximately the center line of film passing thereover. In normal construction, this center line of the film will correspond to the center line of the roller and the grooves will extend outwardly from the center line thereof. In the showing in FIGURE 2 two parallel grooves are shown but, obviously, the number thereof can be varied. Furthermore, the length of the groove and the land can be varied. Rollers 16 and 17 are preferably made of metal and they can, if desired, have a rubber coating thereon.

In operation, the film is extruded from slot die 13 and there is some lengthwise drawing or orientation of the film prior to contact with the quench liquid. Thereafter, the film passes around grooved rollers 16 and 17, each of these rollers rotating at a rate such that the peripheral speed of the roller is faster than the speed of the film passing thereover. This results in a lateral stretching of the film as it is pulled by the outwardly extending grooves or lands in the roller. This peripheral speed should be at least 5 percent greater than the speed of the film in order to obtain appreciable lateral stretching. The maximum can be very much greater and can range to at least 10 times the linear speed of the film passing over the roller. The speed should not be such that there is tearing of the film. This speed varies with the particular plastic film being formed and also depends upon the temperature in the quench bath.

With the high density polyethylene previously described, it is highly desirable to maintain the quench bath at a temperature in the range of 135 to 160° F., preferably 140 to 155° F. In this range, it is possible to produce a film of maximum transparency.

Obviously, the stretching is dependent upon, to some extent, the number of grooved rollers, the relative position of these rollers, and the area of each roller contacted by the film. Excellent results can be obtained using only one roller where the film contacts approximately 180° of the roller. Even more preferable, is an arrangement where two rollers are used and wherein a comparatively small portion of the first roll contacts the film while a considerably larger area of the second roll contacts the film. The initial stretching takes less work and this is done with the first roll while the second roll supplies the final stretching. A greater number of rollers can be used but the relative advantage obtained by this is comparatively small.

The process is applicable for use with a fairly wide range of film thicknesses. Films of very small thickness, such as 0.1 mil can be used but the most suitable range can be said to be 1 to 25 mils. Such films can be stretched by my apparatus up to 100 percent of the extruded width. The extruded thickness depends upon the thickness of the die and the amount of drawing which occurs prior to entry into the quench bath.

In order to illustrate my invention, reference is made to the following specific example, wherein polyethylene was utilized which was prepared by continuous polymerization of ethylene in the presence of cyclohexane and a heat-activated (950° F. for 10 hours in anhydrous air) catalyst comprising chromium oxide supported on a silica-alumina gel in which the weight ratio of silica to alumina was about 9:1. The total chromium content was about 2.5 weight percent, of which a portion was in the hexavalent state. The polymerization was conducted at a temperature of about 300° F. and a pressure of about 500 p.s.i.g. The ethylene was diluted with cyclohexane to a concentration of about 12 percent. The catalyst was suspended in the reaction mixture in a concentration of about 0.1 weight percent. The polyethylene used contained about 0.03 weight percent of 2,6-di-(t-butyl)-4-methylphenol.

*Example*

Polyethylene pellets are fed to the extruder, the extruder being a 2½ inch diameter machine having a length to diameter ratio of 20:1 and a screw compression ratio of 4:1. The barrel was heated to provide molten polymer at a temperature of about 440° F. at the slot die. The slot die extruded the material in a thin sheet having a width of approximately 30 inches. The quench tank was maintained at 140 to 150° F., there being approximately ¼ inch between the die opening and the quench tank. The grooved rollers to produce biaxial orientation were set to give a contact of 80° on roller 16 of FIGURE 1 and 180° on roller 17. The rollers rotate with the surface speed of 180 feet per minute while the film is removed from the bath by means of a take-off roll rotating at 160 feet per minute. This provides an increase in speed of approximately 12½ percent, the periphery of the roller moving faster than the film past it. This provides an extension or stretching of the film of approximately 6 inches. With the screw rotating at 60 r.p.m., there will be produced 80 pounds per hour of this polyethylene film.

While I have illustrated my invention using polyethylene prepared using chromium oxide supported on silica-alumina, it is as stated applicable to many other materials. As an additional example, I can mention polyethylene prepared in the presence of an organometallic catalyst which can be produced, for example, by mixing an aluminum trialkyl with a titanium halide, or an aluminum alkyl halide with a titanium halide.

The plastic material used can contain additives, such as, anti-oxidants, pigments, plasticizers and the like without changing the effectiveness of my invention.

As many possible embodiments can be made of this invention without departing from the scope thereof, it is to be understood that all matter herein set forth is to be interpreted as illustrative and not as unduly limiting the invention.

I claim:

1. A process of producing biaxially oriented thin plastic film comprising extruding a melt of the plastic through a slot die to form a film; passing the film into a quench bath, the distance from the die orifice to the surface of the quench bath being not over ¼ inch; passing the film while in the quench bath over at least one roller having helical grooves on the surface thereof extending outwardly from a point approximately at the center of the film passing thereover, said roller rotating at a rate such that the peripheral speed of the roller is substantially greater than the linear speed of the film passing thereover; and removing the film from the quench bath, said film being biaxially oriented.

2. A process of producing biaxially oriented thin plastic film comprising extruding a melt of the plastic through a slot die to form a film having a thickness of 0.1 to 25 mils; passing the film over at least one roller having helical grooves on the surface thereof extending outwardly from a point approximately at the center of the film passing thereover, said roller rotating at a rate to give a peripheral speed at least 5% greater than the linear film speed and up to at least 10 times the film speed; and recovering the treated film, said film being biaxially oriented.

3. A process of producing biaxially oriented polyethylene film comprising extruding polyethylene having a density of at least 0.94 gram per cubic centimeter at 20° C. through a slot die to form a film; passing the film into a quench bath maintained within the range of 135 to 160° F., the distance from the die orifice to the surface of the quench bath being not over ¼ inch but sufficiently remote therefrom to prevent vaporization of the quench liquid; passing the film while in the quench bath in succession and without intermediate contact with another surface over two rollers having helical grooves on the surface thereof extending outwardly from a point approximately at the center of the film passing thereover, each of said rollers rotating at a rate such that the peripheral speed of the rollers is at least 5 percent greater than but not more than 10 times the linear speed of the film passing thereover; and removing the film from the quench bath, said film being biaxially oriented.

References Cited in the file of this patent

UNITED STATES PATENTS

| | | |
|---|---|---|
| 650,717 | Goodline | May 29, 1900 |
| 1,457,276 | Isherwood | May 29, 1923 |
| 2,144,356 | Alles | Jan. 17, 1939 |
| 2,311,755 | Hutchinson et al. | Feb. 23, 1943 |
| 2,367,173 | Martin | Jan. 9, 1945 |
| 2,421,132 | Tornberg | May 27, 1947 |
| 2,823,421 | Scarlett | Feb. 18, 1958 |
| 2,839,785 | Stevens | June 24, 1958 |
| 2,916,767 | Stevens | Dec. 15, 1959 |

FOREIGN PATENTS

| | | |
|---|---|---|
| 582,721 | Germany | Aug. 3, 1933 |